(12) United States Patent  
Barasch et al.

(10) Patent No.: US 6,880,906 B2
(45) Date of Patent: Apr. 19, 2005

(54) COLOR MIXING

(75) Inventors: Stephen Barasch, Sunnyvale, CA (US); Ken Ota, Sunnyvale, CA (US)

(73) Assignee: Konica Minolta Technology Center, Inc., Tokyo (JP)

( * ) Notice: Subject to any disclaimer, the term of this patent is extended or adjusted under 35 U.S.C. 154(b) by 189 days.

(21) Appl. No.: 10/158,380

(22) Filed: May 29, 2002

(65) Prior Publication Data

US 2003/0223098 A1 Dec. 4, 2003

(51) Int. Cl.[7] .......................... B41J 2/205; B41B 15/00
(52) U.S. Cl. .......................... 347/15; 347/43; 347/358; 358/1.9; 358/3.01
(58) Field of Search .................. 347/15, 43; 358/1.2, 358/1.9, 502, 518, 521, 3.01, 2.99, 3.06, 3.23

(56) References Cited

U.S. PATENT DOCUMENTS 6,052,195 A    4/2000    Mestha et al.
6,517,181 B1 * 2/2003   Yamamoto .................. 347/19
6,627,372 B1   9/2003    Steinhauer et al.
6,776,473 B1   8/2004    Huang et al.

OTHER PUBLICATIONS

International Search Report mailed on Nov. 9, 2004, for PCT patent application No. PCT/US03/16501 filed on May 22, 2003, 2 pages.

* cited by examiner

*Primary Examiner*—Lamson Nguyen
(74) *Attorney, Agent, or Firm*—Morrison & Foerster, LLP

(57) ABSTRACT

A method for determining percentages of colors needed to obtain a mixed color is described. The method includes: determining a difference between an expected function and a measured function of a color resulting from mixing a first and second colors; and utilizing the difference to determine percentages of the first and second colors needed for creating the color.

46 Claims, 4 Drawing Sheets

COLOR MIXING

BACKGROUND OF THE INVENTION

1. Field of the Invention

This invention relates generally to color mixing and, in particular, to predictive color mixing models.

2. Description of the Related Art

It is generally desirable to determine the mix of primary colors necessary to obtain another color. This is particularly true when mixing primary colors that deviate from the ideal or theoretical characteristics for those color. In other words, the issues is particularly relevant when mixing actual colors, as actual color inks have spectral absorption curves that deviate from theoretical absorption curves. The primary colors may be red (R), green (G), and blue (B), (which may collectively be referred to as RGB), as is generally used in color additive system, or cyan (C), magenta (M), and yellow (Y), (which may collectively be referred to as CMY), as is generally used in color subtractive systems. RGB may herein be referred to as primary additive colors. Similarly, CMY may herein be referred to as primary subtractive colors. Alternatively, other colors may be used as primary colors which are used as a base for obtaining other colors.

One predictive color model is the Neugebauer equation. However, the Neugebauer equation is quite complex involving eight variables, which account for the primary additive colors RGB, the primary subtractive colors CMY, as well as black ink and white paper. Due to its complexity, the Neugebauer equation is difficult to apply.

Another predictive model relies on empirical data. In this model, color patches for different colors are printed using a device that is to be characterized. Thereafter, the color values for the patches are measured using a color measuring device, such as a spectrophotometer. Then the data is plotted on a color space. Using the plot on a color space, the necessary mixture for a desired color can be determined. The disadvantages of this model include the following. First, it is time consuming as it involves printing many different combinations of color patches. Second, it is primarily empirical in nature. As a result, its accuracy depends on the number of samples used and increases with an increasing number of samples. However, the larger number of samples increases the time and work required for creating the model. Third, it is not easily transferable to a new device. Anytime a new device is characterized for color combination, the entire process outlined above is repeated as different devices generally have different color characteristics.

It is also generally desirable to obtain a good gray balance or neutral hue when mixing colors. As in the general color mixing context, conventional techniques for obtaining gray balance generally involve empirical methods of trial and error.

The present invention is intended to address this and other disadvantages of conventional predictive color mixing models.

SUMMARY OF THE INVENTION

The present invention encompasses a method of predicting colors needed to obtain a mixed color. In one embodiment, the method of the present invention includes: determining a difference between an expected function and a measured function of a color resulting from mixing a first and second colors; and utilizing the difference to determine percentages of the first and second colors needed for obtaining the color.

The present invention is explained in more detail below with reference to the drawings.

DETAILED DESCRIPTION OF THE INVENTION

The present invention comprises a method and apparatus for color mixing prediction. The following description is presented to enable any person skilled in the art to make and use the invention, and is provided in the context of a particular application and its requirements. Various modifications to the embodiments shown will be readily apparent to those skilled in the art, and the generic principles defined herein may be applied to other embodiments and applications without departing from the spirit and scope of the invention. Thus, the present invention is not intended to be limited to the embodiments shown, but is to be accorded the widest scope consistent with the principles and features disclosed herein.

A color (e.g., a primary color) may be represented in a color space by a parametric equation whose variable is represented by the percentage of the color (e.g., a primary color) present. In one embodiment, colors are represented in a device independent color space. In one embodiment, the colors are represented in a what is commonly referred to as a uniform perceptual color space. In a uniform perceptual color space, the perceptual difference between the same magnitude difference will be the same within the color space. In one embodiment of the present invention, the primary colors are represented by the Commission Internationale d'Eclairage (CIE) 1976 chromaticity coordinates u' and v'. It is to be noted that colors can be represented in other color spaces. For example, colors can be represented the L*a*b* color space, the CIE 1931 chromaticity xy color space, or the tristimulus color space XYZ.

Figure 1:
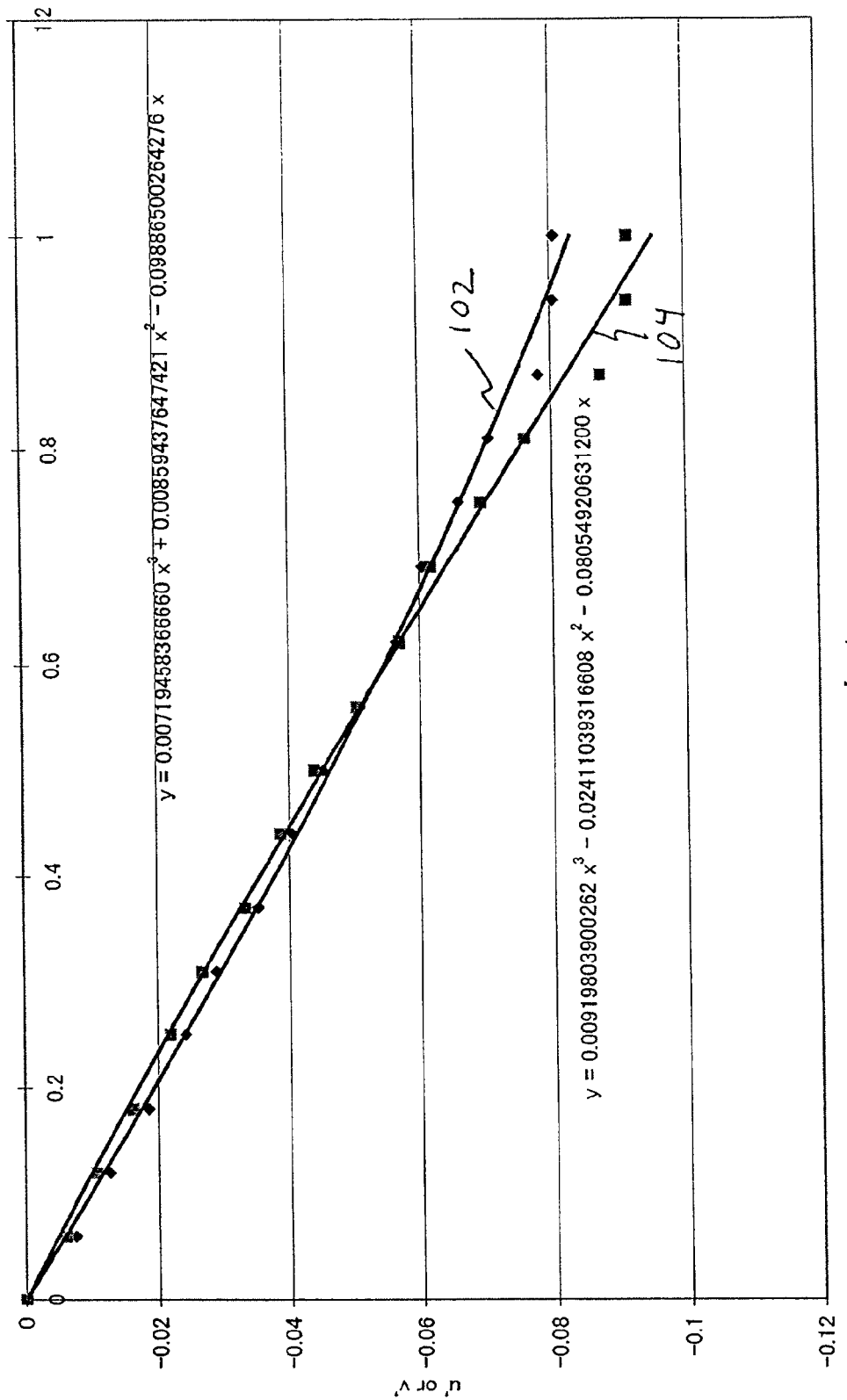
FIG. 1 is an example of a graph illustrating an example of a polynomial curve fit to data of cyan color samples.

A process for obtaining a parametric equation representing the chromaticity of a color is provided by way of the following example with respect to the primary color cyan. The color cyan is printed using different percentages of the color cyan present. This provides a number of print samples of cyan as a function of the percentage of cyan. Thereafter, the printed samples are measured using a color measuring device, such as a spectrophotometer. The chromaticity of the measured data is then plotted. In one embodiment, the plot is one of percentage of the color cyan versus coordinates of a color space. In one embodiment where the u'v' chromaticity is of interest, the percentage of color cyan is plotted versus the u' and v' coordinates. An example of such a plot for the color cyan is shown in FIG. 1. Thereafter, a polynomial curve is fitted to the plotted data. In one embodiment, a polynomial curve is fitted to the data by minimizing the root mean square (RMS) error. Other methods for fitting a curve to the data may also be used. FIG. 1 is an example of a graph illustrating an example of a polynomial curve fit to data of cyan color samples.

In FIG. 1, polynomial curve 102 represents u' as a percentage of color cyan present. In this specific example, u' is represented by the following equation:

$$u'(x) = 0.00919803900262x^3 - 0.02411039316608x^2 - 0.08054920631200x; \quad \text{(Eqn. 1)}$$

where x is the percentage of the color cyan present divided by 100 (e.g., 100% is represented as x=1, 50% is represented as x=0.5, and 0% is represented as x=0).

Similarly, polynomial curve 104 represents v' as a percentage of color cyan present. In this specific example, v' is represented by the following equation:

$$v'(x) = 0.00719458366660x^3 + 0.00859437647421x^2 - 0.09886500264276x; \quad \text{(Eqn. 2)}$$

where x is as defined above.

It is also to be noted that the parametric functions (i.e., equations 1 and 2 above) for the color cyan are only exemplary and are in no way intended to limit the scope of the present invention.

The above process may be used to determine polynomial functions (i.e. parametric equations) for other colors of interest, including the other primary subtractive colors and the primary additive colors. It is to be noted that the parametric function obtained by the above process is device and ink dependent. In other words, the function obtained would depend on the ink used and on the printing device used to print the color samples. Additionally, the parametric function obtained would depend on the method used to fit a parametric function to the measured data.

In two color mixing, two colors are mixed to obtain another color. Mixture of two primary colors results in what is commonly referred to as a pure color. A pure color is comprised of a linear combination of any two primary colors. In one embodiment of the present invention, two primary colors, more specifically two primary subtractive colors, are mixed to create another color, which in this case would be a primary additive color. For example, mixing equal amounts of cyan and magenta results in blue, mixing equal amounts of magenta and yellow results in red, and mixing equal amounts of yellow and cyan results in green. Moreover, mixing unequal amounts of cyan and magenta results in different hues of blue that have more cyan or magenta, mixing unequal amounts of magenta and yellow results in different hues of red that have more magenta or yellow, and mixing unequal amounts of yellow and cyan results in different hues of green that have more yellow or cyan.

Below is a description of the process of determining the mixture of two colors for obtaining another color. This process is described by way of example by describing the process of determining the mixture of two primary subtractive colors, cyan and magenta, for obtaining a primary additive color, blue. It should be noted that although the below description is with respect to mixing cyan and magenta, it applies to the process of mixing other combinations of two colors to obtain another color.

In mixing two colors, the parametric equations for those two colors are combined to determine an expected parametric equation (which may also herein be referred to as the calculated parametric equation) for the color that is a mixture of the two colors. For example, the expected parametric equation for blue, which as stated above results from an equal mixture of cyan and magenta, would be represented by the sum of the parametric equations for cyan with those for magenta. More specifically, the expected parametric equation for blue in the u' coordinate would be the sum of the parametric equation for cyan in the u' coordinate (e.g., equation 1 above) with the parametric equation for magenta in the u' coordinate. Similarly, the expected parametric equation for blue in the v' coordinate would be the sum of the parametric equation for cyan in the v' coordinate (e.g., equation 2 above) with the parametric equation for magenta in the v' coordinate. As noted above, in one embodiment, the parametric equation for magenta would be determined using the process described above with respect to cyan.

In addition to determining the expected parametric equation for blue, the measured parametric equation for blue is also determined. One embodiment of the process of determining the measured parametric equation for blue is as follows. Samples of mixtures of cyan and magenta for obtaining blue are printed using the device which is to be characterized for the mixture. These samples differ in the equal percentages of cyan and magenta present in the mixture used to obtain blue. This provides a number of print samples of blue as a function of the equal percentages of cyan and magenta present. Thereafter, the print samples are measured using a color measuring device, such as a spectrophotometer. The measured data is then plotted. In one embodiment, the plot is one of percentage of the color blue present versus coordinates of a color space. In one embodiment where the u'v' chromaticity space is of interest, the percentage of the color blue is plotted versus the u' and v' coordinates. Thereafter, a polynomial curve is fitted to the plotted data. In one embodiment, a polynomial curve is fitted to the data by minimizing the RMS error. Other methods for fitting a curve to the data may also be used. One polynomial curve is fitted to the data on the u' coordinate and another polynomial curve is fitted to the data on the v' coordinate as a function of percentage of blue present. In one embodiment, these polynomial curves represent the measured parametric equations for blue.

In one embodiment, the present invention does not require performing the above mentioned process for obtaining the parametric equations for the primary subtractive colors or the measured parametric equations for the primary additive colors. For some devices, the parametric equations representing the primary subtractive colors as well as the measured parametric equations for the primary additive colors may already be available. In such cases, the present invention may be practiced without performing the above described process of determining the parametric equations for the primary subtractive colors and determining the measured parametric equations for the primary additive colors. Similarly, the expected parametric equations for the primary additive colors may simply be obtained by using the already existing parametric equations for the primary subtractive colors.

After obtaining the expected and measured parametric equations for the mixed color (e.g., blue), the difference between the expected and measured parametric equations is determined. The difference between the expected and measured parametric equations for a mixed color (e.g., blue) is referred to as the additive failure component for mixing first and second colors (e.g., cyan and magenta) to obtain the mixed color (e.g., blue). This additive failure component is used in determining the percentages of the first and second colors needed to obtain the desired percentages of the mixed color or hues thereof.

Figure 2:
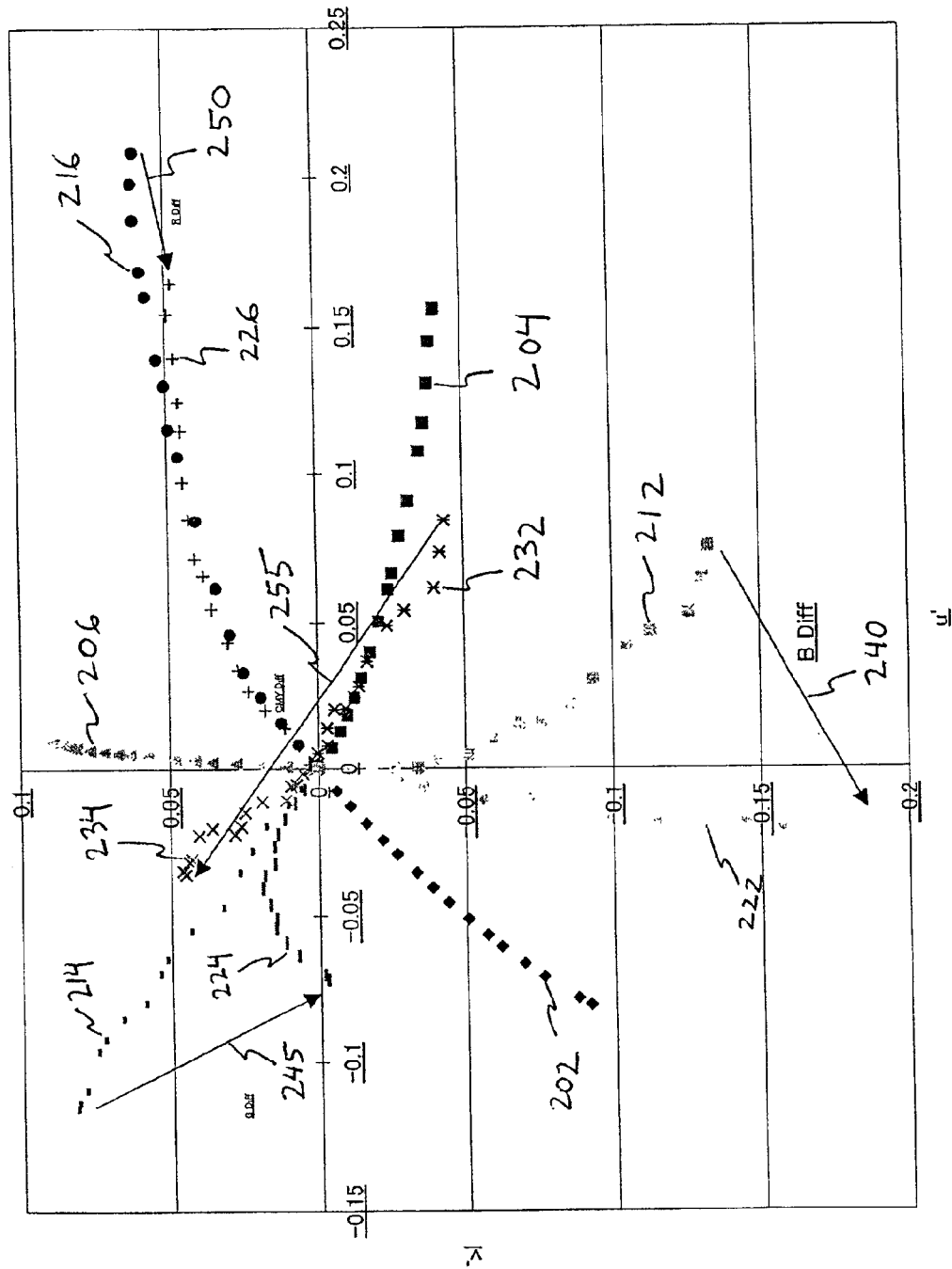
FIG. 2 is a graph illustrating the difference between expected and measured curves.

FIG. 2 is a graph illustrating the difference between expected and measured curves. In FIG. 2, the three primary subtractive colors are plotted in the u'v' space. Curves 202, 204, and 206 represent the curves for cyan, magenta, and yellow, respectively, in the u'v' space. Similarly, the expected curves for the three primary additive colors are plotted in the u'v' space. Curves 212, 214, and 216 represent the expected curves for blue, green, and red, respectively, in the u'v' space. Curves 222, 224, and 226 represent the measured curves for blue, green, and red, respectively, in the u'v' space. Additionally, curves 232 and 234 respectively represent the expected curve and the measured curve for black, which is a mixture of cyan, magenta, and yellow. Finally, arrows 240, 245, 250, and 255 indicate the vector differences between the expected and measured values for blue, green, red, and black, respectively, when a 100% of the respective color is present. In one embodiment, the above mentioned curves are polynomial curves, i.e., curves to which polynomial functions may be fitted.

In a two color mixing case, the mixed color function is the vector sum of the two primary color vectors minus the vector representing the additive failure component. In the u'v' space, a vector would be a two dimensional vector, with one coordinate of the vector represented by u' and the other by v'. Alternatively, instead of a vector, the mixed color function may be represented as two separate functions, where one function is defined on the u' coordinate as a function of percentage of colorant present and the other function is defined in the v' coordinate as a function of percentage of colorant present.

In one embodiment, the additive failure component is modified by the percentage area overlap of the primary colors. For 100% of each of the primary colors the overlap is 100%. As the colorant percentage is reduced, the amount of area overlap is reduced. This percentage area overlap can be calculated using the following Murray-Davis (M-D) equation $Amd=(1-10^{-D})/(1-10^{-Dmax})$, where Amd is the percentage of area overlap, D is the optical density measured for Amd, and Dmax is the maximum optical density when Amd is 100%. Thus, in one embodiment, a function representing the area of overlap by the M-D equation is used to modify the additive failure factor.

Below is a general equation representing a mixed color K in vector form as a function of the percentage d of the mixed color K:

$$K(d)=C1(d1)+d2/d1C2(d2)-AmdC1C2(d);\quad\quad\text{(Eqn. 3)}$$

where C1 is colorant 1;

C2 is colorant 2;

K is the mixed color resulting from mixing C1 and C2;

d1 is amount of C1 (e.g., percentage of C1 divided by 100);

d2 is amount of C2 (e.g., percentage of C2 divided by 100);

d is amount of K (e.g., percentage of K divided by 100);

C1C2 is the contaminant color and is represented by the additive failure resulting from mixing C1 and C2; and Amd is the percentage of area overlap between C1 and C2 (e.g., as determined by the M-D equation above).

Equation 3 above can be represented in one dimensional form in the u' and v' coordinates separately, instead of a vector form, as follows:

$$Ku'(d)=C1u'(d1)+d2/d1C2u'(d2)-AmdC1C2u'(d);\text{ and}\quad\text{(Eqn. 4)}$$

$$Kv'(d)=C1v'(d1)+d2/d1C2v'(d2)-AmdC1C2v'(d).\quad\text{(Eqn. 5)}$$

Equations 4 and 5 above represent the mixed color K on the u' and v' coordinates, respectively, of a u'v' chromaticity space. Thus, Ku'(d) represents the mixed color K as a function of d on the u' coordinate. C1u'(d1) and C2u'(d2) represent the colorants C1 and C2, respectively, as a function of d1 and d2, respectively, on the u' coordinate. Finally, C1C2u'(d) represents the additive failure of mixing colorants C1 and C2 as a function of d on the u' coordinate. The terms Kv'(d), C1v'(d1), C2v'(d2), and C1C2v'(d) represent the corresponding functions on the v' coordinate.

In one embodiment, the additive failure term C1C2(d) is determined for mixing equal amounts of colorants C1 and C2. Thus, in the example of mixing cyan and magenta, the additive failure term C1C2(d) would represent the additive failure of blue. It is also to be noted that the mixed color K is not limited to colors resulting from mixing equal amounts of C1 and C2. Instead, it includes colors resulting from mixing unequal amounts of C1 and C2. Thus, in the example of mixing cyan and magenta, when equal amounts of cyan and magenta are mixed, then the mixed color K would be blue. However, when unequal amounts of cyan and magenta are mixed, then the mixed color K would be some hue of blue that has more cyan or magenta depending on the relative amounts of cyan and magenta.

Equations 4 and 5 may be used to determine d for mixed color K as a function of d1 and d2 for colorants C1 and C2. In one embodiment, values for d1 and d2 are selected and the corresponding values for d, u', and v' are determined using equations 4 and 5. In another embodiment, values for d may be selected, and the corresponding values for d1, d2, u', and v' may be determined using equations 4 and 5. In another embodiment, values for d1 may be selected and the corresponding values for d, d2, u', and v' may be determined using equations 4 and 5. In another embodiment, values for d2 may be selected and the corresponding values for d, d1, u', and v' may be determined using equations 4 and 5.

In one embodiment, the d, d1, and d2 data and the corresponding values of u' and v' are used to characterize an image processor. More specifically, they are used to create a profile for the image processor. As noted above, the polynomial functions representing the primary colors as well as the additive failures are device dependent. In the method of the present invention, values of u' and v' corresponding to the d, d1, and d2 data are derived by use of these device dependent functions and are, therefore, also device dependent. In one embodiment, the profile for the image processor is used to determine the mix of colors needed to achieve a desired u' and v'.

In one embodiment, one or more parametric equations are fitted to the corresponding values of d, d1, d2, u', and v'. In one embodiment, parametric equations relating u' and v' to d1 and d2 are fitted to the u', v', d1 and d2 data. In one embodiment, the image processor profile includes these parametric equations. Using these equations, values of u' and v' are used to the determine d1 and d2, i.e., the amount of colorants C1 and C2 needed to obtain the desired values of u' and v' are determined.

The above mentioned one or more parametric equations allow expressing d1 and d2 as continuous functions of u' and v' values. Thus, instead of being limited to the discrete measured d1 and d2 values and their corresponding u' and v' values, the present invention allows for determining the d1 and d2 values corresponding to any u' and v' values.

In one embodiment, the present invention is used in an image processor (shown in FIG. 4), e.g., a color ink jet printer or a color laser printer. In such an embodiment, a computer (shown in FIG. 4) may send tristimulus XYZ data to the printer. Thereafter, the printer converts the XYZ data to u' and v' data by, for example, using equations 10 and 11 below. The u' and v' date are then used in parametric equations relating u', v', d1 and d2 to determine d1 and d2 needed to obtain the desired u' and v' values. In another embodiment, the above conversion and calculations may be performed in the computer rather than the printer.

In another embodiment, the values of d, d1, d2, u', and v' may be used in a look up table (LUT). It is to be noted that the data in the LUT derived by the method of the present invention would be different from those obtained by conventional methods. In one embodiment, the image processor profile comprises the LUT. In one embodiment, the LUT may be stored in the printer memory. In one embodiment, the desired u' and v' values are input to the LUT to determine the d1 and d2 needed to obtain the desired u' and v' values. In one embodiment, the LUT is stored in a read only memory (ROM). In another embodiment, the LUT may be stored in a volatile memory, such as random access memory (RAM).

As its name suggests, with three color mixing, three colors are mixed to obtained a color. In one embodiment, the three primary colors are mixed to achieve a mixed color. The procedure described above with respect to two color mixing may be extended for predicting the percentages of the three primary colors needed for obtaining a desired mixed color.

In the three color mixing context, there are more additive failure terms to take into account than the single additive failure term of the two color mixing. In three color mixing, there are four additive failure terms that are accounted for in the predictive mixing model. First, there is the additive failure term that accounts for mixing the first and second primary colors. This is similar to the additive failure term in the two color mixing color when mixing the first and second primary colors. Second, there is the additive failure term that accounts for mixing the first and third primary colors. Third, there is the additive failure term that accounts for mixing the second and third primary colors. Finally, there is the additive failure term that accounts for mixing the first, second, and third primary colors. This last additive failure term accounts for the black color introduced as a result of mixing the three primary subtractive colors since adding cyan, magenta, and yellow results in black.

As noted above, mixing two primary subtractive colors results in a primary additive color. Thus, the first three additive failures mentioned in the preceding paragraph relate to those of obtaining blue, green, and red using a mixture of the appropriate primary subtractive colors. As described in relation to the two color mixing, the additive failure is determined by subtracting the measured function for mixing two colors from the expected function for mixing those two colors.

As also noted above, FIG. 2 illustrates an example of the measured and expected curves for blue, green, and red. FIG. 2 also shows the vector difference or additive failure for obtaining each of these primary additive colors. FIG. 2 also shows the expected and measured curves for black, which as noted above results from mixing the three primary subtractive colors. The expected and measured curves for black are obtained in a manner similar to that for obtaining the corresponding curves for blue, green, and red. In the case of black, however, three colors (cyan, magenta, and yellow), rather than two, are used to obtain black prints for measurement. Similarly, three functions (i.e., those for cyan, magenta, and yellow), rather than two, are combined to determine the expected curve (or expected polynomial function) for black.

In one embodiment, the additive failures for blue, green, and red used are those obtained when mixing equal amounts of the corresponding primary subtractive colors. Thus, for blue, the additive failure used is that obtained when mixing equal amounts of cyan and magenta; for green, the additive failure used is that obtained when mixing equal amounts of cyan and yellow; and for red, the additive failure used is that obtained when mixing equal amounts of magenta and yellow. Similarly, in one embodiment, the additive failure for black used is that obtained when mixing equal amounts of cyan, magenta, and yellow.

In one embodiment of three color mixing, factors other than those used in the two color mixing equation, equation 3 above, are used to modify the primary color functions and the additive failure terms. In one embodiment, factors based on the overlap of the three primary subtractive colors are used to modify the respective primary color functions and additive failure terms.

Figure 3:
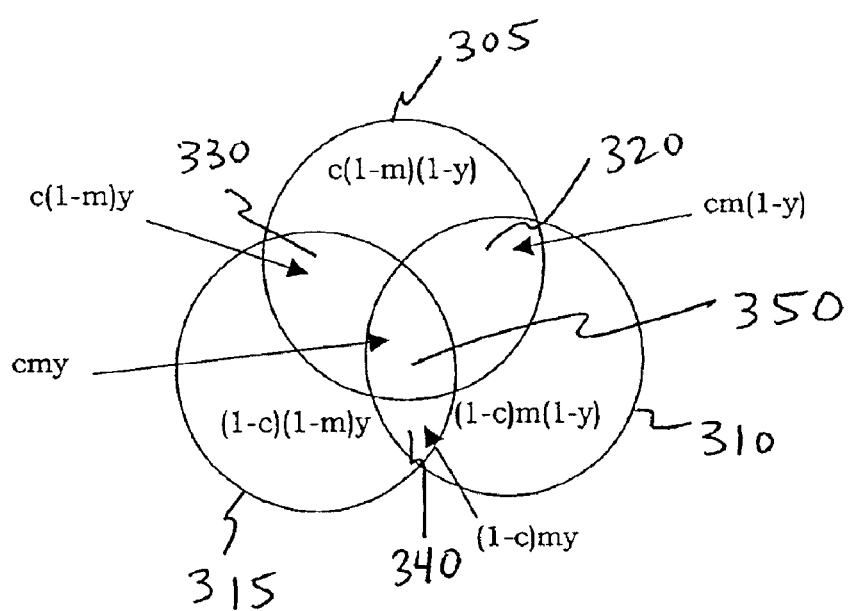
FIG. 3 is a chart illustrating overlap between the primary subtractive colors.

FIG. 3 illustrates the overlap between the primary subtractive colors. In FIG. 3, circles 305, 310, and 315 represent cyan, magenta and yellow, respectively, whose concentration or percentage divided by 100 is indicated as c, m, and y, respectively. In FIG. 3, the area 320 is an area of overlap between circles 305 and 310 and represents the amount of color blue. The amount of color blue in terms of percentage of blue present divided by 100 is represented by $cm(1-y)$. Similarly, the area 330 is an area of overlap between circles 305 and 315 and represents the amount of color green. The amount of color green in terms of percentage of green present divided by 100 is represented by $c(1-m)y$. Similarly, the area 340 is an area of overlap between circles 310 and 315 and represents the amount of color red. The amount of color red in terms of percentage of red present divided by 100 is represented by $(1-c)my$. Finally, the area 350 is an area of overlap between circles 305, 310, and 315 and represents the amount of color black. The amount of color black in terms of percentage of black divided by 100 is represented by $cmy$. The amount of cyan, magenta, and yellow remaining after mixture is $c(1-m)(1-y)$, $(1-c)m(1-y)$, and $(1-c)(1-m)y$, respectively.

In one embodiment, the amounts of blue, green, red, and black are used as modifying factors for the additive failures of blue, green, red, and black, respectively. Similarly, in one embodiment, the amounts of cyan, magenta, and yellow are used as modifying factors for the functions of cyan, magenta, and yellow, respectively. Below are equations representing a color X in the u' and v' coordinates in terms of functions representing the primary subtractive colors and the additive failures for mixing those primary subtractive colors:

$$Xu'(x)=fcu'(c)+fmu'(m)+fyu'(y)+(1-c)myRu'(r)+c(1-m)yGu'(g)+cm(1-y)Bu'(b)+cmyBKu'(bk); \text{ and} \quad \text{(Eqn. 6)}$$

$$Xv'(x)=fcv'(c)+fmv'(m)+fyv'(y)+(1-c)myRv'(r)+c(1-m)yGv'(g)+cm(1-y)Bv'(b)+cmyBKv'(bk); \quad \text{(Eqn. 7)}$$

where x, c, m, y, r, g, b, and bk are the percentages divided by 100 of the mixed color, cyan, magenta, yellow, red, green, blue, and black, respectively;

fcu'(c), fmu'(m), and fyu'(y) are functions of cyan, magenta, and yellow, respectively, as a function of c, m, and y, respectively, in the u' coordinate of the u'v' color space;

Ru'(r), Gu'(g), and Bu'(b), and BKu'(bk) are additive failure functions (i.e., the difference between expected and measured functions) for red, green, blue, and black, respectively, in the u' coordinate of the u'v' color space; and the terms in equation 7 are the counterparts of those in equation 6 in the v' coordinate.

In one embodiment, equations 6 and 7 are simplified by using the additive failure values obtained when using 100% of primary colors and the mixed colors. Under these conditions, equations 6 and 7 simplify to the following equations:

$$Xu'(x) = fcu'(c) + fmu'(m) + fyu'(y) + (1-c)myRu' + c(1-m)yGu' + cm(1-y)Bu' + cmyBKu'; \text{ and} \quad \text{(Eqn. 8)}$$

$$Xv'(x) = fcv'(c) + fmv'(m) + fyv'(y) + (1-c)myRv' + c(1-m)yGv' + cm(1-y)Bv' + cmyBKv'; \text{ and} \quad \text{(Eqn. 9)}$$

where Ru', Gu', Bu', and BKu' are the additive failures for red, green, blue, and black, respectively, when using 100% of the primary subtractive colors needed for obtaining red, green, blue, and black, in the u' coordinate of the u'v' space; and Rv', Gv', Bv', and BKv' are the additive failures for red, green, blue, and black when using 100% of the primary subtractive colors needed for obtaining red, green, blue, and black, in the v' coordinate of the u'v' space.

As will be noted from equations 8 and 9, they involve four variables x, c, m, and y. Thus, equations 8 and 9 can be solved by selecting two of variables x, c, m, and y, and solving for the remaining two variables. The selected variables and to be solved for variables may be chosen in any combination.

In one embodiment, the values for c, m, and y are selected and the corresponding values for x, u', and v' are determined using equations 8 and 9. In another embodiment, values for c and m may be selected, and the corresponding values for y, x, u', and v' may be determined using equations 8 and 9. In another embodiment, values for m and y may be selected, and the corresponding values for c, x, u', and v' may be determined using equations 8 and 9. In another embodiment, values for c and y may be selected, and the corresponding values for m, x, u', and v' may be determined using equations 8 and 9.

In one embodiment, the c, m, and y data and the corresponding values of x, u' and v' are used to characterize an image processor. More specifically, they are used to create a profile for the image processor. As noted above, the polynomial functions representing the primary colors as well as the additive failures are device dependent. In the method of the present invention, values of x, u' and v' corresponding to the c, m, and y data are derived by use of these device dependent functions and are, therefore, also device dependent. In one embodiment, the profile for the image processor is used to determine the mix of colors needed to achieve a desired u' and v'.

In one embodiment, one or more parametric equations are fitted to the corresponding values of c, m, y, x, u', and v'. In one embodiment, parametric equations relating u' and v' to c, m, and y are fitted to the c, m, y, x, u', and v' data. In other words, parametric equations in which c, m, and y, respectively, are expressed as a function of u' and v' are determined. In one embodiment, the image processor profile includes these parametric equations. Using these equations, values of u' and v' are used to determine c, m, and y, i.e., the amount of colors cyan, magenta, and yellow needed to obtain the desired values of u' and v'.

The above mentioned one or more parametric equations allow expressing c, m, and y as continuous functions of u' and v' values. Thus, instead of being limited to the discrete measured c, m, and y values and their corresponding u' and v' values, the present invention allows for determining the c, m, and y values corresponding to any u' and v' values.

In one embodiment, the present invention is used in an image processor (shown in FIG. 4), e.g., a color ink jet printer or a color laser printer. In such an embodiment, a computer (shown in FIG. 4) may send tristimulus XYZ data to the printer. Thereafter, the printer converts the XYZ data to u' and v' coordinates by, for example, using equations 10 and 11 below. The u' and v' data are then used in parametric equations relating u', v', c, m, and y to determine c, m, and y needed to obtain the desired u' and v' values. In another embodiment, the above conversion and calculations may be performed in the computer rather than the printer.

In another embodiment, the values x, c, m, y, u', and v' may be used in an LUT. It is to be noted that the data in the LUT derived by the method of the present invention would be different from those obtained by conventional methods. In one embodiment, the image processor profile comprises the LUT. In one embodiment, the LUT may be stored in the printer memory. In one embodiment, the desired u' and v' values are input to the LUT to determine the c, m, and y needed to obtain the desired u' and v' values. In one embodiment, the LUT is stored in a ROM. In another embodiment, the LUT may be stored in a volatile memory, such as a RAM.

Below is a summary of one embodiment of a procedure for determining the percentages (or amounts) of primary colors needed to obtain a desired mixed color.

Color values of cyan, magenta, yellow inks are measured. In one embodiment, the inks used are "pure" inks in the sense that they are inks that are used in the device as representing these primary subtractive colors without any mixture. As noted above, however, color absorption curves for even "pure" inks do not completely match the absorption curves for those colors in theory. In one embodiment, color values are measured for concentrations of the above colors in 10% increments. In other words, color values for 10%, 20%, 30%, . . . , 90% and 100% of each color are measured. In another embodiment, the color values may be measured using some other increment of percentage of color present, e.g., 5%.

Similarly color values of red, green, blue and composite black (mixing ink) are measured. In one embodiment, the color values of red, green, blue and composite black are measured for 100% of each. Similarly, the expected color values for red, green, blue, and composite black are calculated for 100% of those colors by using 100% measured values for the corresponding primary subtractive colors needed to obtain red, green, blue, and composite black.

In one embodiment, color values may be measured or provided in one color space and converted to another. For example, color values may be provided in the XYZ space and converted to the u'v' space. Below are a set of equations for converting color values from the XYZ space to the u'v' space:

$$u' = 4X/(X+15Y+3Z); \text{ and} \quad \text{(Eqn. 10)}$$

$$v' = 9Y/(X+15Y+3Z). \quad \text{(Eqn. 11)}$$

Thereafter, polynomial functions are determined for cyan, magenta, and yellow by fitting curves to the measured data for those colors. The following polynomials are obtained: fcu'(c), fcv'(c), fmu'(m), fmv'(m), fyu'(y), fyv'(y).

Thereafter, the additive failures (i.e., the color difference between expected and measured values) are calculated for the primary additive colors (blue, green, and red) and composite black. More specifically, the additive failures are calculated for a 100% for each of the primary subtractive colors and the mixed colors (i.e., the primary additive colors and black). Ru', Gu', Bu', and BKu' are the calculated additive failures for red, green, blue, and black, respectively, on the u' coordinate of the u'v' color space. Rv', Bv', Gv', and BKv' are the calculated additive failures for red, green, blue, and black, respectively, on the v' coordinate of the u'v' color space.

The polynomial functions and additive failures are used in equations 8 and 9 above. As noted above, equations 8 and 9 can be solved by selecting two of variables x, c, m, and y, and solving for the remaining two variables. The selected variables and to be solved for variables may be chosen in any combination.

In one embodiment, one or more parametric equations are fitted to the corresponding values of c, m, y, x, u', and v'. In one embodiment, parametric equations relating u' and v' to c, m, and y are fitted to the c, m, y, x, u', and v' data. In one embodiment, the image processor profile includes these parametric equations. Using these equations, values of u' and v' are used to determine c, m, and y, i.e., the amount of a colors cyan, magenta, and yellow needed to obtain the desired values of u' and v'. In another embodiment, the values x, c, m, y, u', and v' may be used in an LUT. In one embodiment, the image processor profile includes the LUT. In one embodiment, the LUT may be stored in the printer memory. In one embodiment, the desired u' and v' values are input to the LUT to determine the c, m, and y needed to obtain the desired u' and v' values.

In one embodiment, the present invention addresses the issue of gray balance. The objective in dealing with the gray balance issue is to find all combinations of the percentage amount of the primary colors that produce a neutral hue. Neutral hue is achieved when u'=0 and v'=0. When using paper that has an absorption curve that deviates from that of white color in theory, then the origin of the u'v' space has to be normalized to take into account the white point of the paper used. In such an instance, the neutral hue is achieved when u'-wp=0 and v'-wp=0, where wp is the white point of the paper. In the below discussion, when referring to u'=0 and v'=0, it is assumed that the origin has been normalized by taking into account the white point of the paper used for printing. In one embodiment, the neutral hue problem is solved in a color space, such as, for example, the Lu'v' color space, where the luminance value L is independent of the chrominance values u' and v'.

In the general case, solving the neutral hue problem involves solving equations 6 and 7 above for the case where Xu'(x) and Xv'(x) are both equal to zero. A simplified version of the problem is to solve equations 8 and 9 above for the case where Xu'(x) and Xv'(x) are equal to zero.

Below is a summary of one embodiment of finding the percentages of primary subtractive colors present for achieving neutral hue. In this embodiment, the process for solving the neutral hue problem, but for a few exceptions, involves the same steps as the above summarized procedure for determining the percentages (or amounts) of primary colors needed to obtain a desired mixed color. The difference between solving the neutral hue problem and determining the percentages of primary colors needed to create a mixed color includes the following. In the neutral hue problem, equations 8 and 9 are solved for the case where Xu'(x) and Xv'(x) are equal to zero. In such a case, equations 8 and 9 are simplified into the following equations:

$$0 = fcu'(c) + fmu'(m) + fyu'(y) + (1-c)myRu' + c(1-m)yGu' + cm(1-y)Bu' + cmyBKu'; \text{ and} \quad \text{(Eqn. 12)}$$

$$0 = fcv'(c) + fmv'(m) + fyv'(y) + (1-c)myRv' + c(1-m)yGv' + cm(1-y)Bv' + cmyBKv'; \quad \text{(Eqn. 13)}$$

The solutions of equations 12 and 13 are the percentages of cyan, magenta and yellow to achieve neutral hue, i.e., good gray balance. As can be noted from equations 12 and 13, they involve only three variables c, m, and y. In one embodiment of the invention, values for one of the three variables c, m, and y are selected and the corresponding values for the remaining two variables are solved using equations 12 and 13 above. In one embodiment, the variable with the maximum value of all solutions to equations 12 and 13 is chosen as the independent variable.

In one embodiment, m is chosen as the independent variable. Accordingly, values are selected for m and the values for c and y are solved. In one embodiment, values are selected form in 10% increments (i.e., 10%, 20%, 30%, ..., 90%, and 100%) and using equations 12 and 13, the values for c and y are solved. In another embodiment, other increments for the values of m may be used, e.g., 5% increments. Also in yet another embodiment, values for c or y may be selected and the values for m and y or c and m, respectively, are solved using equations 12 and 13.

It is to be noted that different combinations of c, m, and y that satisfy equations 12 and 13 above represent different neutral gray levels. In one embodiment of the invention, where 8 bits are used to represent different neutral gray levels, there are 256 neutral gray levels. In one embodiment, the combinations of c, m, and y corresponding to the different neutral gray levels are used to characterize an image processor. More specifically, they are used to create a profile for the image processor. As noted above, the polynomial functions representing the primary colors as well as the additive failures are device dependent. In the method of the present invention, the combinations of c, m, and y corresponding to different neutral gray levels are derived by use of these device dependent functions and are, therefore, also device dependent. In one embodiment, the profile for the image processor is used to determine the mix of colors c, m, and y needed to achieve a desired neutral gray level.

In one embodiment, one or more parametric equations are fitted to the corresponding values of c, m, y, and neutral gray levels. In one embodiment, parametric equations relating the neutral gray levels to c, m, and y are fitted to the c, m, y, and neutral gray level data. In other words, the parametric equations express c, m, and y, respectively, as a function of the neutral gray levels. In one embodiment, the image processor profile includes these parametric equations. Using these equations, the value of the desired neutral gray level is used to determine c, m, and y, i.e., the amount of colors cyan, magenta, and yellow needed to obtain the desired neutral gray level.

The above mentioned one or more parametric equations allow expressing c, m, and y as continuous functions of the neutral gray levels. Thus, instead of being limited to the above mentioned discrete measured c, m, and y values and their corresponding neutral gray levels, the present invention allows for determining the c, m, and y values corresponding to all 256 neutral gray levels possible in a system that uses 8 bits to define neutral gray levels. It is to be noted that in another embodiment there may be some other number of neutral gray levels depending on the number of bits used to represent the different neutral gray levels.

In another embodiment, the values c, m, y, and neutral gray levels may be used in an LUT. It is to be noted that the data in the LUT derived by the method of the present invention would be different from those obtained by conventional methods. In one embodiment, the image processor profile includes the LUT. In one embodiment, the LUT may be stored in the printer memory. In one embodiment, the desired neutral gray level is input to the LUT to determine the c, m, and y needed to obtain the desired neutral gray level. In one embodiment, the LUT is stored in a ROM. In another embodiment, the LUT may be stored in a volatile memory, such as a RAM.

The method and apparatus of the present invention may be used in many systems. For example, the method may be used to characterize image processors. More specifically, the method and apparatus of the present invention may be used in developing printer profiles for color printers, such as color ink jet printers and color laser printers. One specific application of the present invention is to determine what combinations of c, m, and y are required to obtain a particular color as represented for example by u' and v' values. Another specific application of the method of the present invention is in determining what combinations of c, m, and y are required to obtain a particular neutral gray level.

Figure 4:
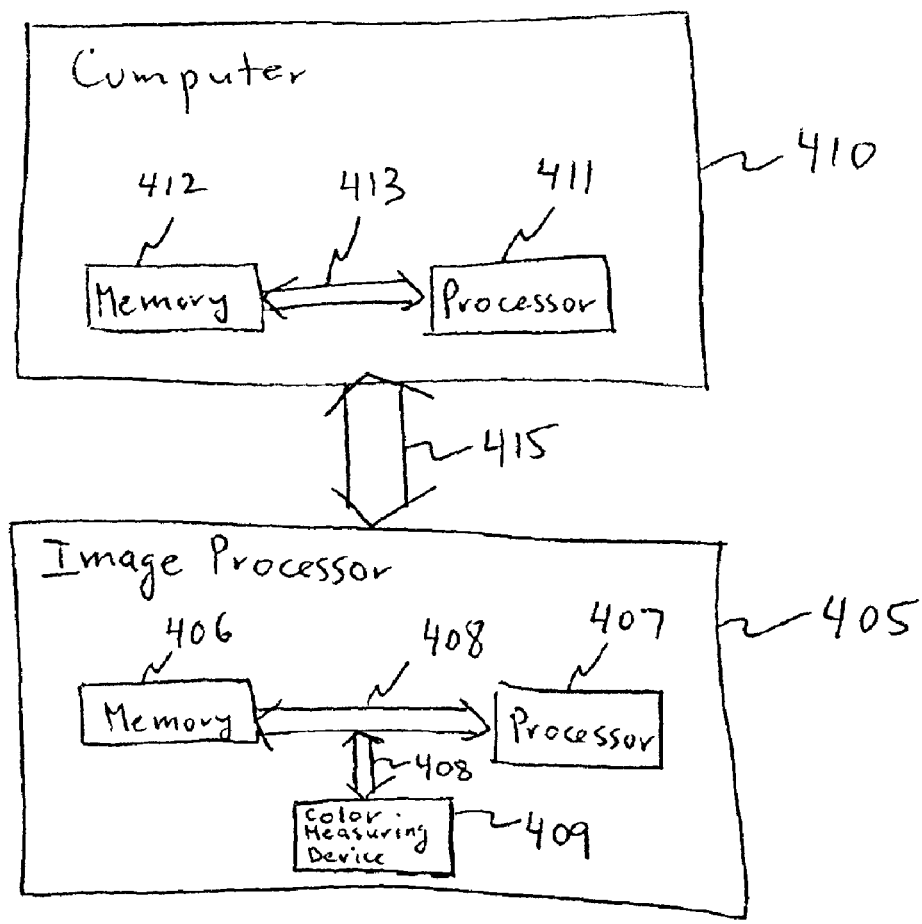
FIG. 4 is a block diagram of an example of a system comprising an embodiment of the image processor of the present invention.

FIG. 4 is a block diagram of an example of a system comprising an embodiment of the image processor of the present invention. In FIG. 4, image processor 405 is coupled to a computer 410 via communication channel 415. In one embodiment, the image processor 405 is a color laser printer. In another embodiment, the image processor 405 is a color ink jet printer. Image processor 405 includes a memory 406 and a processor 407, which is coupled to memory 406 via communication channel 408. In one embodiment, memory 406 stores a profile for image processor 405. In one embodiment, memory 406 comprises ROM. In another embodiment, memory 406 comprises RAM. Image processor 405 may include other memories in addition to memory 406.

Computer 410 includes processor 411 and memory 412, which is coupled to processor 411 via communication channel 413. In one embodiment, processor 411 comprises a central processing unit (CPU). In one embodiment, memory 412 comprises ROM. In another embodiment, memory 412 comprises RAM. Computer 410 may include other memories in addition to memory 412.

In one embodiment, memory 406 stores parametric equation(s) derived by the process described above that relate u' and v' to c, m, y, and x. In another embodiment, memory 406 stores parametric equation(s) derived by the process described above that relate neutral gray levels to c, m, and y. In one embodiment, these parametric equation(s) are part of the profile for image processor 405. In one embodiment, processor 407 utilizes these parametric equation(s) to determine c, m, and y values corresponding to the desired u' and v' values. Also, in one embodiment, processor 407 utilizes these parametric equation(s) to determine c, m, and y values corresponding to the desired neutral gray level. In another embodiment, processor 411 of computer 410 may be used for this purpose. Also, in another embodiment, memory 412 of computer 410 may be used to store the parametric equation(s).

In another embodiment, memory 406 may include a LUT developed by the process described above. In one embodiment, the LUT stores values of c, m, y, and x, and the corresponding values of u' and v'. In another embodiment, the LUT stores values for c, m, and y, and the corresponding neutral gray levels. In one embodiment, the LUT(s) are part of the profile for image processor 405. In another embodiment, the LUT may be stored in memory 412 of computer 410.

In one embodiment, memories 406 and 412 may be integrated with processors 407 and 411, respectively. In another embodiment, processors 407 and 411 may include memories (other than memory 406 and 412) for storing the above mentioned parametric equation(s) or LUT(s).

It is to be noted that factors, such as, for example, the age or the temperature of the image processor 405 may affect the colors of prints produced by the image processor 405. Thus, it is desirable to recharacterize image processor 405 to account for changes due to age, temperature, or other factors.

In one embodiment, the image processor 405 may characterize or recharacterize itself. As used herein recharacterization refers to characterization that occurs after the initial characterization that is a part of the manufacturing process. As part of the recharacterization process, the above mentioned printing of samples of primary subtractive colors and primary additive colors is performed and the print samples are measured. In one embodiment, image process 405 may include a color measuring device 409, such as a spectrophotometer, for measuring the print samples. In one embodiment, color measuring device 409 is coupled to the communication channel 408. The processor 407 utilizes the above measured data in the above described methods of the present invention to characterize the image processor 405 for determining the color mix to obtain a desired color and/or a desired neutral gray level. The new characterization results are used in a profile of the image processor 405.

In order to reduce the time needed for recharacterization, it is desirable to reduce the number of samples printed. As the present invention is intended to allow for characterization using a fewer number of samples, it is particularly useful in the recharacterization context.

It is to be noted that image processor 405 shown in block diagram in FIG. 4 is only exemplary of an image processor which embodies the present invention. Thus, the method of the present invention is not limited to use with an image processor such as that shown in FIG. 4. In another embodiment, the present invention may be used in conjunction with an image processor that, for example, does not include processor 407 or color measuring device 409.

While the present invention has been particularly described with respect to the illustrated embodiments, it will be appreciated that various alterations, modifications and adaptations may be made based on the present disclosure, and are intended to be within the scope of the present invention. While the invention has been described in connection with what are presently considered to be the most practical and preferred embodiments, it is to be understood that the present invention is not limited to the disclosed embodiment but, on the contrary, is intended to cover various modifications and equivalent arrangements included within the scope of the appended claims.

What is claimed is:

1. A method comprising:
   determining a difference between an expected function and a measured function of a color resulting from mixing a first and second colors, said determining comprising;
      determining in expected function for the color based on a combination of a first color function and a second color function,
      printing the color using a plurality of mixtures of the first and second colors,
      measuring the color printed using the mixtures of the first and second colors, and
      determining the measured function for the color based on measuring the color printed using the mixture; and
   utilizing the difference to determine percentages of the first and second colors needed for obtaining the color.

2. The method of claim 1, wherein the determining the difference further comprises:
   printing the first color as a percentage of amount of the first color;

printing the second color as a percentage of amount of the second color;

measuring the first color as printed;

measuring the second color as printed;

determining the first color function for the first color based on measured data for the first color; and determining the second color function for the second color based on measured data for the second color.

3. The method of claim 1 further comprising:

adding the first function to the second function; and accounting for the additive failure factor for mixing the first and second colors;

wherein the additive failure is the difference between the expected function and the measured function of the color resulting from mixing the first and second colors, further wherein the first color is a first primary color, the second color is a second primary color, the first color function is a first primary color function, and the second color function is a second primary color function.

4. The method of claim 3 further comprising:

modifying the second primary color function by a factor that is a ratio of a percentage of the second primary color aver a percentage of the first primary color.

5. The method of claim 4 further comprising:

modifying the additive failure function by a factor that is representative of amount of area overlap between the first and second primary color.

6. The method of claim 5, wherein the factor that is representative of the amount of area overlap is determined using the equation $Amd=(1-10^{-D})/(1-10^{-Dmax})$, where Amd is the percentage of area overlap, D is the optical density measured for Amd, and Dmax is the maximum optical density when Amd is 100%.

7. The method of claim 6, wherein the first primary color function and the second primary color function are defined in a color space.

8. The method of claim 7, wherein the first and second primary functions are defined in first and second Coordinates of the color space.

9. The method of claim 6, wherein the percentages of the first primary color and the second primary color are selected, corresponding percentages of the color are determined using equations defined on the first and second coordinates of the color apace, and corresponding coordinate values in the color space are determined using equations defined on the first and second coordinates of the color space.

10. The method of claim 3 further comprising:

adding a third primary color function for a third primary color to the first and second primary functions;

accounting for the additive failure for mixing the first and third primary colors;

accounting for the additive failure for mixing the second and third primary colors; and accounting for the additive failure for mixing the first, second, and third primary colors.

11. The method of claim 10, wherein percentages of the first, second, and third primary colors are selected, corresponding percentages of the selected color are determined using equations defined on the first and second coordinates of the color space, and corresponding coordinate values in the color space are determined using equations defined on the first and second coordinates of the color space.

12. The method of claim 11, wherein the percentages of the first, second, and third primary colors and corresponding coordinate values in the color space are utilized to determine at least one parametric equation relating coordinate values in the color space to the percentages of the first, second, and third primary colors.

13. An image processor comprising a memory, wherein the memory stores at least one parametric equation relating coordinate values in a color space to percentages of a first, second, and third primary colors, wherein the at least one parametric equation is determined according to the method of claim 12.

14. The method of claim 11, wherein the percentages of the first, second, and third primary colors and corresponding coordinate values in the color space are utilized to develop a look up table (LUT) relating coordinate values in the color spans to the percentages of the first, second, and third primary colors.

15. An image processor comprising a memory, wherein the memory stores a look up table (LUT) relating coordinate values in a color space to percentages of a first, second, and third primary colors, wherein the LUT is developed according to the method of claim 14.

16. The method of claim 10, wherein the color space is a u'v' color space and each of u' and v' value are set to zero after correcting for paper white, the method further comprising:

selecting a percentage value for one of the first, second, and third primary colors; and determining percentage values for the other two of the first, second, and third primary colors.

17. The method of claim 16, wherein percentages of the first, second, and third primary colors that produce a neutral gray are determined.

18. The method of claim 17, wherein the percentages of the first, second, and third primary colors and corresponding neutral gray levels are utilized to determine a parametric equation relating neutral gray levels to the percentages of the first, second, and third primary colors.

19. An image processor comprising a memory, wherein the memory stores at a parametric equation relating neutral gray levels to percentages of the first, second, and third primary colors, wherein the parametric equation is developed according to the method of claim 18.

20. The method of claim 17, wherein the percentages of the first, second, and third primary colors and corresponding neutral gray levels are utilized to develop a look up table (LUT) relating neutral gray levels to the percentages of the first, second, and third primary colors.

21. An image processor comprising a memory, wherein the memory stores a look up table (LUT) relating neutral gray levels to percentages of the first, second, and third primary colors, wherein the LUT is developed according to the method of claim 20.

22. The method of claim 10, wherein;

the additive failure for mixing the first and second primary colors is determined for mixing a 100% of the first primary color with a 100% of the second primary color;

the additive failure for mixing the first and third primary colors is determined for mixing a 100% of the first primary color with a 100% of the third primary color;

the additive failure for mixing the second and third primary colors is determined for mixing a 100% of the second primary color with a 100% of the third primary color; and the additive failure for mixing the first, second, and third primary colors is determined for mixing a 100% of the first primary color with a 100% of the second primary color and a 100% of the third primary color.

23. An image processor comprising a memory, wherein the memory stores at least one parametric equation relating coordinate values in a color space to percentages of a first, second, and third primary colors, wherein the at least one parametric equation is utilized to determine percentages of the first, second, and third primary colors required to obtain a color that is a mix of the first, second, and third primary colors.

24. The image processor of claim 23, wherein the image processor comprises one of a color laser printer and an ink jet printer.

25. The image processor of claim 23, wherein the at least one parametric equation is determined by utilizing a first additive failure for mixing the first and second primary colors, a second additive failure for mixing the first and third primary colors, and a third additive failure for mixing the second and third primary colors.

26. The image processor of claim 25, wherein the first additive failure is determined for mixing a 100% of the first primary color with a 100% of the second primary color, the second additive failure is determined for mixing a 100% of the first primary color with a 100% of the third primary color, and the third additive failure is determined for mixing a 100% of the second primary color with a 100% of the third primary color.

27. An image processor comprising a memory, wherein the memory stores at least one parametric equation relating neutral gray levels to percentages of first, second, and third primary colors, wherein the at least one parametric equation is utilized to determine percentages of the first, second, and third primary colors required to obtain a predetermined neutral gray level.

28. The image processor of claim 27, wherein the image processor comprises one of a color laser printer and an ink jet printer.

29. The image processor of claim 27, wherein the at least one parametric equation is determined by utilizing a first additive failure for mixing the first and second primary colors, a second additive failure for mixing the first and third primary colors, and a third additive failure for mixing the second and third primary colors.

30. The image processor of claim 29, wherein the first additive failure is determined for mixing a 100% of the fiat primary color with a 100% of the second primary color, the second additive failure is determined for mixing a 100% of the first primary color with a 100% of the third primary color, and the third additive failure is determined for mixing a 100% of the second primary color with a 100% of the third primary color.

31. A method of mixing colors in an image processor, the method comprising:

utilizing at least one parametric equation relating coordinate values in a color space to percentages of a first and second primary colors, wherein coordinate value, in the color space of a color that is a mix of the first and second primary colors are utilized in the at least one parametric equation to determine percentages of the first and second primary colors required to obtain the color.

32. The method of claim 31, wherein the at least one parametric equation is determined by utilizing a first additive failure for mixing the first and second primary colors.

33. The method of claim wherein the at least one parametric equation relates coordinate values in the color space to percentage of the first primary color, the second primary color, and a third primary color, wherein coordinate values of a mixed color that is a mix of the first, second, and third primary colors are utilized in the at least one parametric equation to determine percentages of the first, second, and third primary colors required to obtain the mixed color.

34. The method of claim 33, wherein the at least one parametric equation is determined by utilizing the first additive failure for mixing the first and second primary colors, a second additive failure for mixing the first and third primary colors, and a third additive failure for mixing the second and third primary colors.

35. The method of claim 34, wherein the first additive failure is determined for mixing a 100% of the first primary color with a 100% of the second primary color, the second additive failure is determined for mixing a 100% at the first primary color with a 100% of the third primary color, and the third additive failure is determined for mixing a 100% of the second primary color with a 100% of the third primary color.

36. A method of mixing colors in an image processor or, the method comprising:

utilizing at least one parametric equation relating neutral gray levels to percentages of first, second, and third primary colors, wherein the at least one parametric equation is utilized to determine percentages of the first, second and third primary colors required to obtain a predetermined neutral gray level.

37. The method of claim 36, wherein the at least one parametric equation is determined by utilizing a first additive failure for mixing the first and second primary colors, a second additive failure for mixing the first and third primary colors, and a third additive failure for mixing the second and third primary colors.

38. The method of claim 37, wherein the first additive failure is determined for mixing a 100% of the first primary color with a 100% of the second primary color, the second additive failure is determined for mixing a 100% of the first primary color with a 100% of the third primary color, and the third additive failure is determined for mixing a 100% of the second primary color with a 100% of the third primary color.

39. A method of characterizing an image processor, the method comprising determining a first additive failure for mixing first and second colors; and utilizing the first additive failure to determine at least one mix of percentages of the first and second colors and a third color for obtaining a neutral gray level.

40. The method of claim 39 further comprising:

determining a second additive failure for mixing the first color and a third color;

determining a third additive failure for mixing the second and third colors; and determining a fourth additive failure for mixing the first, second, and third colors;

wherein the utilizing comprises utilizing the first second, third, and fourth additive failures to determine a plurality of mix of percentages of the first, second, and third colors for obtaining a plurality of neutral gray levels.

41. The method of claim 40, wherein the first additive failure is determined for mixing a 100% of the first color with a 100% of the second color, the second additive failure is determined for mixing a 100% of the first color with a 100% of the third color, the third additive failure is determined for mixing a 100% of the second color with a 100% of the third color, and the fourth additive failure is determined for mixing a 100% of the first color, with a 100% of the second color and a 100% of the third color.

42. The method of claim 41, wherein a percentage is selected for one of the first, second, and third colors and the corresponding percentages are determined for two of the first, second, and third colors for obtaining a neutral gray level.

43. The method of claim 42 further comprising determining at least one parametric equation relating neutral gray levels to percentages of the first, second, and third colors, wherein the parametric equation is utilized to determine percentages of the first, second, and third colors required to obtain a predetermined neutral gray level.

44. The method of claim 43, wherein the parametric equation is included in a profile of the image processor.

45. The method of claim 42 further comprising determining a look up table (LUT) relating neutral gray levels to percentage of the first, second, and third colors, wherein the LUT is utilized to determine percentages of the first, second, and third colors required to obtain a predetermined neutral gray level.

46. The method of claim 45, wherein the LUT is included in a profile of the image processor.

* * * * *